2,712,033

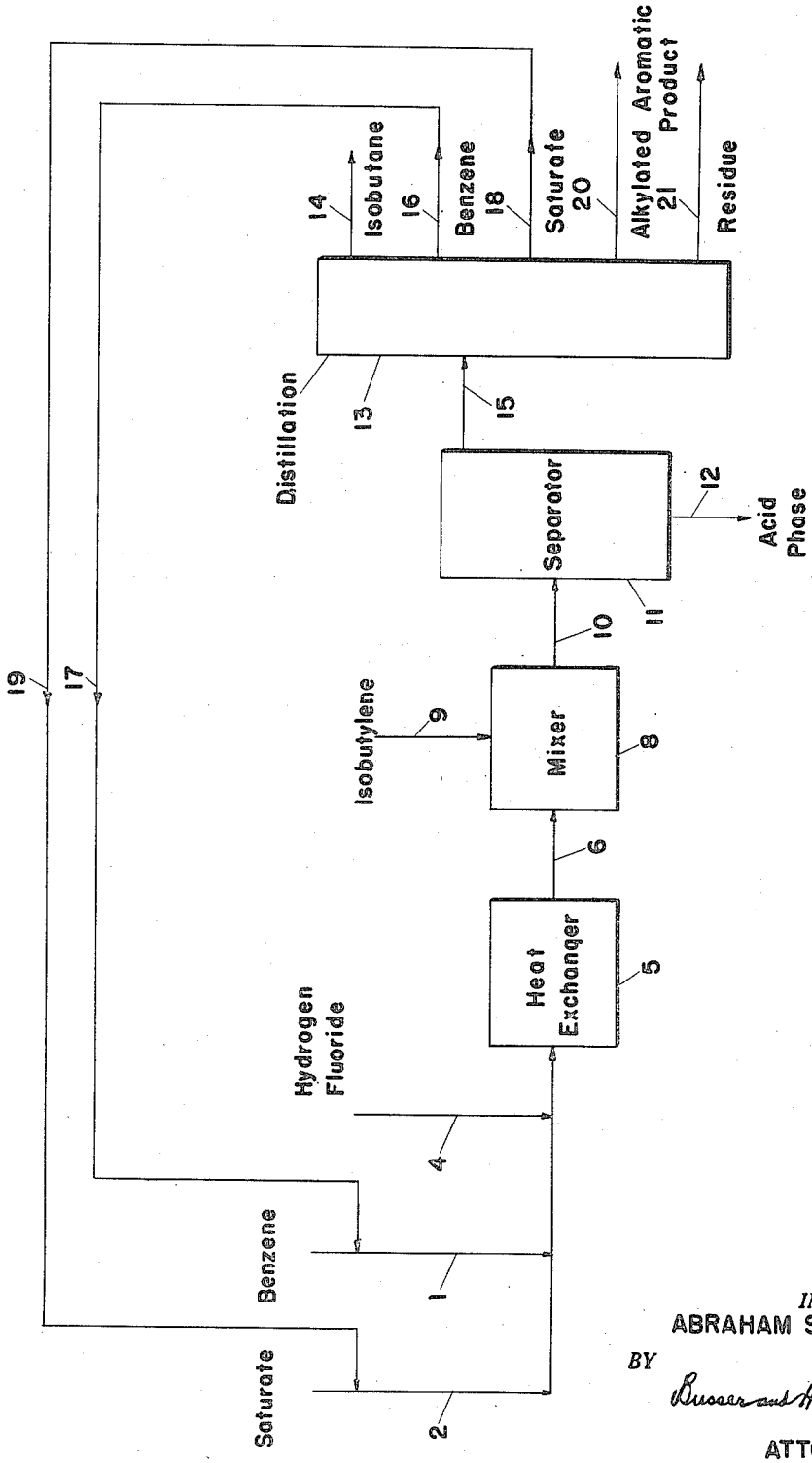

ALKYLATION OF AROMATIC HYDROCARBONS

Abraham Schneider, Philadelphia, Pa., assignor to Sun Oil Company, Philadelphia, Pa., a corporation of New Jersey Application March 4, 1954, Serial No. 413,988

13 Claims. (Cl. 260—671)

This invention relates to a catalytic alkylation process, and more particularly to the alkylation of aromatics with isoparaffins under novel catalytic conditions.

Aromatics have heretofore been alkylated with paraffins or naphthenes by what is known as the Friedel-Crafts reaction. This reaction, as is well known, involves a two-step process wherein the paraffin is chlorinated with chlorine gas, and the alkyl halide thus formed is joined to the aromatic compound by use of a metal halide, such as aluminum chloride. In this process, the chlorine is irreversibly converted to hydrogen chloride and as such presents a disposal problem; the metal halide catalyst is deactivated in the reaction, being converted to a complex form from which its regeneration is difficult and uneconomical.

It has now been discovered that alkylatable aromatics can be alkylated with isoparaffins which contain at least 1 tertiary hydrogen atom per molecule by subjecting a mixture of such isoparaffins and aromatics to the simultaneous action of hydrogen fluoride and a tertiary olefin. According to the invention, when hydrogen fluoride and a tertiary olefin are brought together in the presence of an alkylatable aromatic and a tertiary hydrogen-containing isoparaffin, a catalytic condition is established which is effective to cause such isoparaffin to alkylate the aromatic. Thus, as hereinafter fully illustrated, the present invention provides a one-step process whereby aromatics are alkylated with isoparaffins to produce alkylated aromatics in good yields, and in which process the acid catalyst may be regenerated and recycled. A further advantage is that the present process can be conducted in the present conventional alkylation contactors, i. e., special apparatus is unnecessary.

The mechanism of the alkylation reaction of the present process is complicated, and is not completely understood. The overall reaction, however, may be expressed by the equation:

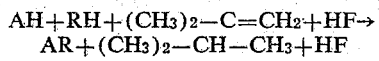

$$AH + RH + (CH_3)_2—C=CH_2 + HF \rightarrow$$
$$AR + (CH_3)_2—CH—CH_3 + HF$$

wherein AH represents an alkylatable aromatic, RH represents a tertiary hydrogen-containing isoparaffin, isobutylene represents the tertiary olefins which may be employed in the process of the present invention, as hereinafter defined, and AR represents the desired alkylated aromatic product. It will be noted that isobutane is a product, and it has been found characteristic of the present reaction that the tertiary olefin employed is reduced to the corresponding paraffin. It is further characteristic of the alkylated aromatic product of the present process that the alkyl radical attached to the aromatic nucleus contains the same number of carbon atoms as did the isoparaffin. It is also characteristic of the present process that substantially no alkyl fluorides are formed, and practically all of the hydrogen fluoride employed is easily recoverable from the process, and may be recycled thereto.

In practicing the present invention, an emulsion of the aromatic to be alkylated, the tertiary hydrogen-containing isoparaffin and hydrogen fluoride is contacted with a tertiary olefin. Preferably, a mixture of isoparaffins such as those contained in saturate hydrocarbon fractions is employed. By the term "tertiary olefin," as employed herein, is meant a hydrocarbon containing both a carbon to carbon unsaturated double bond and a side chain. By the term "saturate," and terms of similar import, as employed herein, is meant a dearomatized hydrocarbon fraction composed substantially of a mixture of branched chain paraffins, including naphthenes, which have at least 5 carbon atoms per molecule, and which contain an average of at least 1 tertiary hydrogen atom per molecule, i. e., a hydrogen atom attached to a carbon atom, which carbon atom in turn is attached to 3 other carbon atoms, and by the term, "isoparaffin," is meant a single such branched chain hydrocarbon, this term being included in the broader term "saturate," unless otherwise stated.

The aromatics which may be employed in the process of the present invention are the alkylatable aromatics, i. e., those members of the aromatic series which have a substitutable position on the aromatic nucleus. Such aromatics include, for example, benzene, toluene, o-, m- and p-xylenes, mixtures of xylenes, ethylbenzene, naphthalene, alpha methyl naphthalene, beta methyl naphthalene, diphenyl, the aromatics contained in hydrocarbon fractions, especially those fractions which have been subjected to cracking, and the like. In general, however, the aromatic to be alkylated should not have more than four substituent groups on the aromatic nucleus. Saturates and isoparaffins which may be employed in the process of the present invention to alkylate the aromatics include, for example, substantially pure isoparaffins containing from 5 to about 30, and preferably from 5 to 20, carbon atoms per molecule, such as isopentane, 2-methyl heptane, 2-methyl decane, 3-butyl decane, branched chain hexadecanes, heptadecanes, and the like, mixtures thereof, and hydrocarbon fractions containing a substantial proportion of such isoparaffins, alkyl naphthenes such as methyl- and ethylcyclohexane, and mixtures of such naphthenes and isoparaffins. Saturate petroleum fractions, such as dearomatized fractions from catalytic cracking, which contain a substantial proportion of the above and other isoolefins may advantageously be employed. Other hydrocarbons which may be present in such fractions serve as diluents and do not enter the reaction. Such saturate fractions should contain above about 25%, and preferably above 50%, isoparaffins of 5 to 30 carbon atoms having an average of at least 1 tertiary hydrogen atom per molecule. It is preferred to employ isoparaffins other than those wherein the carbon atom attached to the tertiary hydrogen atom is in the beta position relative to a quaternary carbon atom, since, as has been found, under the conditions of the present process such isoparaffins do not give, to an appreciable extent, alkylated aromatics wherein the alkyl substituent contains the same number of carbon atoms as the isoparaffin.

Hydrocarbon fractions, especially those obtained from petroleum, containing both aromatics and saturates may be employed in the process of the present invention. By contacting a tertiary olefin with hydrogen fluoride in the presence of such a fraction, a catalytic condition is established whereby the saturates alkylate the aromatics. If desired, a further quantity of aromatics or saturates may be added to the fraction to obtain the desired concentration of each. The added aromatics or saturates may be the same as those of the fraction, or different aromatics and saturates may be added and may be so selected that a desired product is obtained.

Tertiary olefins which may be employed in the present process have 1 olefinic double bond and at least 1 side chain per molecule, and preferably have the tertiary carbon atom attached to the olefinic double bond. The next preferred tertiary olefins are those which have the olefinic bond in the alpha or beta position relative to the side chain. As illustrative of these compounds may be mentioned isobutylene, which is the preferred tertiary olefin of the present invention, 2-methylbutene-2; 3-methylbutene-1; 2,3-dimethylbutene-1; 2-methylbutene-3; 4-ethylhexene-1; 6-methylheptene-3; and the like. A further preferred embodiment of the present invention contemplates the use of cyclic tertiary olefins, such as methylcyclohexene-1, which is a preferred component, methylcyclohexene-3; 2-cyclohexylpropene-1; methylcyclopentene-1; and the like, and it is intended that the term "tertiary olefin" include such compounds. Olefins which do not meet the above requirements do not cause the desired alkylation reaction to occur to an appreciable extent within the present temperature range. Such olefins might be operable at higher temperatures, but in such case disproportionation and cleavage reactions predominate and preclude recovery of appreciable quantities of the desired alkylated aromatic product.

The quantities of reactants employed in the present process may be substantially varied and good results obtained therewith. From 0.2 to 6 moles of saturate can be employed for each mole of aromatic, i. e., the mole ratio of saturate to aromatic is maintained within the ratio of from 1:5 to 6:1. The quantity of tertiary olefin to employ may advantageously be from 0.1 to 1 mole for each mole of aromatics plus saturates, i. e., a mole ratio of tertiary olefin to aromatics plus isoparaffins of from 1:10 to 1:1, good results being obtained when about 0.4 to 0.6 moles of tertiary olefin for each mole of aromatics plus saturates is employed. It is advantageous to employ an excess of hydrogen fluoride, from about 1 to 8 moles, and preferably from 2 to 5 moles, for each mole of aromatic plus saturate gives good results. Anhydrous hydrogen fluoride gives good results, but hydrogen fluoride admixed with, e. g., hydrocarbon oils or water, wherein the hydrogen fluoride content is above 90%, and preferably above 95%, may be employed.

In practicing the present invention, it is advantageous to maintain the temperature of alkylation from above about 50° C. to about 200° C., and preferably between 75° C. and 150 C. Below 50° C., the desired alkylation occurs only relatively slowly, and alkylation of the aromatic with the tertiary olefin, instead of the saturate, may occur to an appreciable extent. At temperatures above 200° C. considerable disproportionation of the saturates, and cracking of the alkylated aromatic product, is observed. In general, temperatures of from 75° C. to 150° C. cause the desired alkylation reaction to progress rapidly, and substantial yields of the desired alkylated aromatic product are obtained. The pressure during alkylation should be sufficient to keep the reactants in the liquid phase. Using the preferred reactants and temperature range of the present invention, pressures of from 100 to 200 p. s. i. are preferred and give good results, although in some instances, lower or higher pressures may be employed.

The time required for the alkylation varies according to the temperature employed, the reactants, and tertiary olefin employed, their concentrations, and the like, and is not considered a critical variable, it being obvious that sufficient time should be permitted to obtain the desired product in good yields. In general, an alkylation time of 15 minutes to 2 hours attains the desired result, and when preferred reactants, catalyst, and conditions are employed, from 30 to 60 minutes is suitable.

The accompanying drawing is a diagrammatic flow sheet illustrating a preferred embodiment of the present invention. Referring to the flow sheet, benzene being used to illustrate the aromatics which may be alkylated in accordance with the present invention, saturates, and hydrogen fluoride are introduced into the system through lines 1, 2 and 4 respectively. As hereinbefore described, the saturate employed should contain a substantial portion of isoparaffins containing at least 1 tertiary hydrogen atom per molecule, and preferably should not have the tertiary hydrogen-containing carbon atom in the beta position relative to a quaternary carbon atom. The benzene, saturate, and hydrogen fluoride are passed through heat exchanger 5, which may be either a cooler or a heater, depending on the temperature at which the alkylation is to be performed, and the mixture is then passed through line 6 into mixer 8, provided with a stirrer. If desired, means (not shown) to heat mixer 8 may be provided. Isobutylene, employed to illustrate the tertiary olefins which may be employed, is introduced in the mixer through line 9. On contacting the isobutylene with the hydrogen fluoride in the presence of benzene and saturate, a catalytic condition is immediately established whereby the saturate alkylates the benzene.

The reaction mixture leaves mixer 8 through line 10 and is passed into separator 11, wherein the acid and hydrocarbon phases are separated. The acid phase, usually containing a small amount of dissolved high molecular weight oil, is removed through line 12, and the hydrocarbon phase is passed through line 15 to distillation zone 13. Hydrogen fluoride is easily recovered from the acid phase by distillation (by means not shown) and may be recycled through the process. The distillation zone 13 may advantageously consist of a plurality of such zones from which the various fractions are separated. Isobutane, formed by reduction of isobutylene is removed through line 14. Benzene may be separated and removed through line 16, and recycled to the process through line 17. The unreacted saturate may be separated through line 18 and recycled through the process through line 19. The desired alkylated aromatic is separated through line 20, and the residue removed through line 21.

It has been found characteristic of the present process that some of the tertiary olefin employed as a catalyst will be converted to the corresponding paraffin. Thus, if butylene is employed, some isobutane will be formed and may be recovered from the reaction mixture. A portion thereof, and also a portion of the tertiary olefin, may alkylate the aromatic. Under the conditions described for the present process, especially the preferred conditions, these reactions occur to only a relatively slight extent, and hence do not significantly adversely affect the desired alkylation. In the process illustrated by the flow diagram, some tertiary butyl benzene will be obtained in the reaction mixture. This tertiary butyl benzene may be recycled in the process, since it has been found that the tertiary butyl group, under the conditions of reaction, is cleaved from the benzene, thus providing isobutylene (which serves as the catalyst) and benzene (which is alkylated by the saturates). Likewise, where other tertiary olefins, and/or other aromatics, are employed, any tertiary alkyl aromatic which may be formed may be recycled in the same manner as tertiary butyl benzene.

The following examples illustrate preferred embodiments of the present invention, which is not to be considered as limited thereto:

*Example 1*

Into a contactor provided with a stirrer were introduced 200 g. (2.56 moles) benzene, 86 g. (1.0 mole) 2-methylpentane and 145 g. (7.3 moles) anhydrous hydrogen fluoride. Over a period of 15 minutes 73 g. (1.3 moles) isobutylene was added. The reaction mixture was then heated to 100° C. for 1 hour with stirring, the pressure being 200 p. s. i. The reaction mixture was cooled and the organic layer washed with water. Isobutane was separated by distillation, a total of 41.4 g. (0.71 mole) being obtained. The remaining hydrocarbon mixture was dried and the components thereof separated by distillation. There were obtained 40.0 g. of 2-methylpentane, 134.5 g. benzene, and 53.5 g. of a mixture of hexylbenzene isomers. There were also obtained 27.5 g. of t-butyl benzene (boiling point=169° C.), 6.5 g. di-t-butylbenzene (boiling point=237° C.), and 13 g. residue. The hexylbenzene isomers were collected in the temperature range of from 178° C. to 215° C. at atmospheric pressure, and had a refractive index $n_D^{25}=1.4952$.

The yield of hexylbenzenes, based on benzene consumed and considering the t-butylbenzene and di-t-butylbenzene as stock for recycling, was 61%. The weight percent of hexylbenzene isomers in the (2-methylpentane free) alkylate was 24.1, and of tertiary butyl benzene was 12.7. This shows the large yield of the product of alkylation of the aromatic with the isoparaffin as compared to the yield of the product of alkylation of the aromatic by the tertiary olefin.

*Example 2*

Benzene was alkylated with the hydrocarbons of a petroleum saturate fraction having an average molecular weight of 250 and an average of 2.2 naphthene rings per molecule as follows: 150 g. (1.92 moles) of benzene, 140 g. (0.560 mole) of saturates, and 193 g. of hydrogen fluoride were admixed and 62 g. (1.11 moles) of isobutylene added to the stirred admixture at room temperature. The temperature was increased to 95° C. and the reaction mixture stirred at this temperature for 45 minutes. The layers were then allowed to stratify and were separated by decanting. There were recovered two layers, 201 g. of a hydrogen fluoride layer and 333 g. of organic layer. The recovered organic layer was washed, dried, and the components thereof separated by distillation. There were recovered the following:

| | |
|---|---|
| Alkylated benzene product | 45.3 g., 0.145 mole. |
| Isobutane | 16.1 g., 0.278 mole. |
| Benzene | 82.8 g., 1.06 moles. |
| Tertiary butyl benzene | 45.9 g., 0.342 mole. |
| Ditertiary butyl benzene | 11.7 g., 0.062 mole. |
| Saturates | 103.3 g., 0.413 mole. |

The alkyl group of the alkylated benzene product had the same number of carbon atoms as the saturates from the petroleum fraction. The alkylated benzene product had a molecular weight of 312 (determined by viscosity correlations) as compared to a theoretical molecular weight of 328. Further analysis of the product showed that there were an average of 2.6 naphthene rings per molecule and an average of 1.1 aromatic rings per molecule. These data show that naphthene rings of saturate hydrocarbons are not cleaved in the alkylation process.

*Example 3*

Benzene was alkylated, using the procedure of Example 1, with saturate fractions from three different crudes: dearomatized straight run naphtha having a molecular weight of 156, and $n_D^{20}=1.4279$ (run A); dearomatized East Texas straight run gasoline, boiling range 100–190° C., having an average of 10 carbon atoms per molecule (run B); and dearomatized Webster Crude having a boiling range of 204–260° C., an average of 13 carbon atoms per molecule, and $n_D^{20}=1.4546$ (run C). Data obtained are as follows:

| | Run A | Run B | Run C |
|---|---|---|---|
| Reaction temperature ° C. | 100 | 100 | 100 |
| Charge: | | | |
| benzene, g. | 201 | 200 | 200 |
| saturate, g. | 101 | 100 | 125 |
| hydrogen fluoride, g. | 134 | 112 | 126 |
| isobutylene, g. | 60 | 71 | 73.5 |
| Alkylated benzene product, g. | 56 | 69 | 63 |
| Yield, mole percent (Based on saturates consumed) | 78 | 100 | 64 |
| Saturates recovered, g. | 52.5 | 57 | 56.5 |
| Benzene recovered, g. | 143 | 141 | 124 |

To illustrate recovery of the alkylated benzene products of the process of the invention, in run B of the above table, an acid layer about 352 g. was separated from an organic layer. The organic layer was washed with water, dried and distilled. After separation of isobutane there were recovered about 330 cc. of organic products. Recovery of products in run C was performed in a substantially identical manner, there being recovered about 335 cc. of organic products after separation of isobutane. The compositions of these butane-free alkylates, in volume percent, were:

| | Run B | Run C |
|---|---|---|
| benzene | 48.5 | 42.7 |
| saturates | 13.6 | 21.5 |
| t-butylbenzene | 4.6 | 14.6 |
| intermediate boiling (not identified) | 10.6 | 1.8 |
| alkylated product | 22.7 | 19.4 |

The "alkylated product" of the table consisted of the products of alkylation between benzene and the saturates having at least one tertiary hydrogen atom of the petroleum fractions employed. After separation by distillation, as above described, a small amount of high boiling material, about 10 g. in run B and about 20 g. in run C, remained unidentified.

*Example 4*

Two experiments were made at different temperatures using dearomatized second-pass catalytic gas-oil as the saturate material. This saturate material contained about 70.8% of isoparaffins and about 26.2% of isoparaffins including a naphthene ring, the remainder being aromatics and a small amount of olefins; the average molecular weight was 222 (16 carbon atoms per molecule), and $n_D^{20}=1.4505$.

The procedure was to introduce the saturate, benzene and hydrogen fluoride into a contactor provided with a stirrer, and then introduce isobutylene into the agitated mixture at room temperature. The mixture was then heated to the indicated temperature for the specified time, with continued stirring, after which it was transferred to a copper vessel cooled to −78° C., and the components thereof separated by decantation and distillation. Operational variables and results are summarized below:

| | Run A | Run B |
|---|---|---|
| Reaction temperature ° C. | 60 | 100 |
| Charge: | | |
| benzene, g. | 100 | 102 |
| saturate, g. | 100 | 100 |
| hydrogen fluoride, g. | 139 | 123 |
| isobutylene, g. | 46 | 52 |
| Alkylated aromatic product, g. | 8 | 30 |
| Yield, mole percent (based on saturates reacted) | 23 | 63 |
| Saturates recovered, g. | 76 | 65 |
| Benzene recovered | 43.5 | 56 |
| High boiling residue | 12 | 5 |
| Wt. percent of total charge recovered* | 81.8 | 86.3 |

*Including isobutane, t-butylbenzene, and di-t-butylbenzene.

*Example 5*

Example 4 was repeated at 100° C. except that a larger quantity of benzene was employed. Quantities of reactants were: 202 g. benzene, 101 g. saturates, 51.2 g. isobutylene, and 123.5 g. hydrogen fluoride.

There were recovered 30.5 g. of alkylated benzene (yield=56 mol percent based on saturates consumed), and 60.5 g. of saturates, together with the by-products mentioned in Example 4, including 6 g. of high boiling residue. Weight percent of the total charge recovered was 92.

*Example 6*

The dearomatized second-pass catalytic gas-oil described in Example 4 was used to alkylate various aromatic compounds. The procedure described in Example 4 was followed. Operational variables and results were as follows:

| | Run A | Run B | Run C |
|---|---|---|---|
| Reaction temperature °C. | 100 | 100 | 25 |
| Charge: | | | |
| toluene, g | 200 | | |
| mixed xylenes, g | | 150 | |
| m-xylene, g | | | 124.5 |
| saturate, g | 125 | 150 | 150 |
| hydrogen fluoride, g | 154 | 116.5 | 115 |
| isobutylene | 78 | 69 | 71.5 |
| Alkylated aromatic product, g | 36 | 31.1 | 11 |
| Yield, mole percent (based on saturates consumed) | 94 | 59 | 8 |
| Saturates recovered, g | 98 | 113.4 | 141 |
| Aromatics recovered: | | | |
| toluene, g | 117 | | |
| mixed xylenes | | 70.5 | |
| m-xylene, g | | | 12.9 |

In run C, which was performed at 25° C., there were also obtained 120.5 g. of tertiary butyl-m-xylene, which shows the substantial alkylation of the aromatic with the tertiary olefin at temperatures below about 50° C., as above described. By way of comparison, in run A, only 23 g. of tertiary butyltoluene were obtained.

*Example 7*

A Webster straight run dearomatized saturate was separated into fractions by distillation. The various fractions were used to alkylate benzene, 150 g. of the saturate and 150–151 g. of benzene being employed in each instance.

The technique employed was substantially as described in Example 4: the benzene, saturate and hydrogen fluoride were introduced into a contactor equipped with a stirrer. The mixture was agitated at room temperature while the isobutylene was introduced over a period of about two minutes. There was appreciable warming of the reaction mixture. The stirred mixture was then heated to 100° C. for 90 minutes. The maximum pressure developed was 190 p. s. i.

The contactor was cooled in an ice bath to 0° C. and the hydrogen fluoride removed. The organic layer was washed with water and distilled.

| Saturate | | | HF Added (g.) | Isobutylene Added (g.) | Alkylated Aromatic Product (g.) | Saturates Reacted (wt. percent) | Yield, Mole Percent Based on Reacted Saturates | Molecular Weight of Product [1] | Theoretical Molecular Wt. of Product [2] |
|---|---|---|---|---|---|---|---|---|---|
| Boiling Range (°C.) | Molecular Weight | Saturates (Vol. Percent) | | | | | | | |
| 149–204 | 142 | 100 | 124 | 78 | 30 | 59.9 | 59.9 | 212 | 218 |
| 204–260 | 181 | 100 | 134 | 75 | 82 | 70.6 | 54.5 | 258 | 257 |
| 204–260 [3] | 181 | 100 | 172 | 75 | 49 | 38.2 | 59.8 | 228 | 257 |
| 260–316 | 222 | 99.7 | 141 | 76 | 30 | 41.5 | 36.0 | | |
| 260–316 | 222 | 99.7 | 159 | 79 | 58 | 47.7 | 60.8 | 298 | 298 |
| 316–371 | 292 | 99.7 | 176 | 77 | 50 | 44.7 | 59.5 | | |
| 371–482 | 435 | 97.3 | 168 | 76 | 12 | 23.3 | 28.6 | | |

[1] Determined by boiling point-density correlation; method described in Ind. Eng. Chem. 38 442 (1946).
[2] Calculated from known molecular weights of the benzene and saturate.
[3] Alkylation at 25° C. instead of 100° C.

*Example 8*

Example 7 was substantially duplicated using, as the saturate, an East Texas straight run dearomatized fraction having a boiling range of 204–260° C., an average molecular weight of 211, $n_D^{20}=1.4377$, and containing 99.7 vol. percent of saturates.

There were obtained 50 g. of alkylated product, the mole percent yield, based on saturates reacted, being 46.5%. The product had a boiling range of 291–374° C. and an average molecular weight of 275 (theoretical molecular weight=287).

*Example 9*

Example 7 was substantially duplicated using, as the saturate material, Webster dearomatized two-pass catalytic fractions having boiling ranges of 149–204° C., 204–260° C., and 260–316° C., their average molecular weights being, respectively, 146, 192 and 223. The following results were obtained:

| Saturate fraction (boiling range, °C.) | 149–204 | 204–260 | 260–316 |
|---|---|---|---|
| Product obtained, g | 71 | 59 | 38.5 |
| Yield, mole percent (based on saturates reacted) | 46.6 | 70.5 | 40.0 |
| Average molecular weight of product | 225 | 260 | 300 |
| Theoretical molecular weight of product | 222 | 268 | 299 |
| Boiling range of product, °C | 240–320 | 269–360 | 320–402 |
| $n_D^{20}$ | 1.5060 | 1.4987 | 1.4993 |

*Example 10*

Example 7 was substantially duplicated, using Webster saturate fractions as therein described, and the 204–260° C. fraction described in Example 9, to alkylate alpha-methyl naphthalene. Data obtained are as follows:

| Saturate fraction (°C.) | [1] 149–204 | 149–260 | 204–260 | 260–316 | [2] 204–260 |
|---|---|---|---|---|---|
| Product obtained, g | 91.5 | 89.5 | 81.5 | 90 | 62 |
| Yield, mole percent (based on saturates reacted) | | 69.2 | 54.0 | 55.2 | 53.8 |
| Average molecular weight of product | 288 | 258 | 268 | 316 | 313 |
| Theoretical molecular weight of product | 286 | 286 | 325 | 366 | 336 |
| Boiling range of product | 166–243 | 160–191 | 160–188 | 157–263 | 188–248 |

[1] Alkylation at 60° C.; all others were at 100° C.
[2] Instead of a Webster fraction, a fraction of second-pass catalytic gas-oil was used.

*Example 11*

The Webster 260–316° C. saturate fraction described in Example 7 was employed to alkylate toluene, the quantities of reactants and technique described being substantially identical to those described in Example 7.

The quantity of product obtained was 31.5 g., which represents a mole percent yield, based on the saturates reacted, of 53%. The average molecular weight of the product was 308 (theoretical=312), boiling range= 365–450° C., and $n_D^{20}=1.5222$.

*Example 12*

To 150 g. of a fraction of Webster crude boiling between 204 and 260° C., and containing its natural aromatics and saturates, were added 150 g. of benzene and 134.5 g. of hydrogen fluoride. 72 g. of isobutylene was introduced into the mixture over a period of 8 minutes, with stirring, and the stirred mixture was heated to 100° C. for 90 minutes.

The quantity of alkylated aromatic product obtained was 60 g., representing a mole percent yield, based on the saturates reacted, of 54%. The product had a boiling range of 281.6–356° C., an average molecular weight of 234, and $n^{20}_D = 1.5160$.

Example 13

The portion of Example 7 using a 204–260° C. saturate fraction was duplicated except that butene-1, instead of isobutylene, was used as a catalytic component.

A small amount of alkylation occurred, some alkylated product being obtained, but the yields, both per pass and ultimate, were so low that the process must be considered practically inoperative.

Other embodiments are obviously included within the scope of the present invention, such as the addition of hydrogen fluoride to a mixture of aromatic, saturate and tertiary olefin, instead of addition of the tertiary olefin, as hereinbefore described, though the latter is preferred. It is not permissible, however, to premix the hydrogen fluoride and tertiary olefin in the absence of the aromatics and saturate, since polymerization of the olefin will result. It is also permissible to employ a small amount of boron trifluoride as a promoter for the reaction, in which case, lower temperatures than otherwise would be employed are preferred. However, the use of such promoters is generally unnecessary, and is not preferred, especially in view of their high cost and the fact that they cause undesired reactions, such as polymerization of the tertiary olefin, cracking, and the like.

The foregoing examples illustrate preferred embodiments of the present invention, including the use of aromatics from petroleum fractions, and the use of an entire fraction including aromatics, isoparaffins, and naphthenes in the process. The process of the present invention may be carried out by batch, intermittent, or continuous processes.

The lower molecular weight alkyl-aromatic products prepared in accordance with the present invention may be employed in fuel compositions, as lubricating and cutting oil additives, and in the preparation of detergents.

This application is a continuation-in-part of application Serial No. 96,754, filed June 2, 1949, now abandoned.

The invention claimed is:

1. An alkylation process which comprises bringing together in the liquid phase at a temperature of from 50° C. to 200° C., hydrogen fluoride and a tertiary mono-olefin in the presence of an alkylatable aromatic hydrocarbon and a saturate hydrocarbon having at least 5 carbon atoms and 1 tertiary hydrogen atom, wherein the mole ratio of said saturate to said aromatic hydrocarbon is from 5:1 to 1:6 and the mole ratio of said tertiary mono-olefin to said aromatic hydrocarbon plus said isoparaffin hydrocarbon is from 1:10 to 1:1, whereby said isoparaffin alkylates said aromatic hydrocarbon to form an alkyl aromatic having an alkyl substituent containing the same number of carbon atoms as said isoparaffin hydrocarbon, and separating said alkyl substituted aromatic hydrocarbon from the reaction mixture.

2. The process according to claim 1 wherein the tertiary olefin is isobutylene.

3. An alkylation process which comprises bringing together in the liquid phase at a temperature of from 50° C. to 200° C., hydrogen fluoride and a tertiary mono-olefin in the presence of benzene and an isoparaffin hydrocarbon having at least 1 tertiary hydrogen atom, wherein the mole ratio of said isoparaffin to benzene is from 5:1 to 1:6 and the mole ratio of said tertiary mono-olefin to isoparaffin plus benzene is from 1:10 to 1:1, whereby said isoparaffin alkylates said benzene to form an alkyl benzene having an alkyl substituent containing the same number of carbon atoms as said isoparaffin hydrocarbon, and separating from the reaction mixture said alkyl substituted benzene.

4. The process according to claim 3 wherein the isoparaffin hydrocarbon is a saturate hydrocarbon fraction.

5. The process according to claim 4 wherein the tertiary olefin is isobutylene.

6. An alkylation process which comprises bringing together, in the liquid phase at a temperature of from 50° C. to 200° C., hydrogen fluoride and isobutylene in the presence of benzene and a saturate hydrocarbon fraction composed substantially of a mixture of branched chain paraffins having an average of at least 1 tertiary hydrogen atom per molecule boiling between 149° C. and 482° C., wherein the mole ratio of said saturate hydrocarbon fraction to said benzene is from 5:1 to 1:6, and wherein the mole ratio of isobutylene to benzene plus said saturate hydrocarbon fraction is from 1:10 to 1:1, whereby said saturate alkylates said benzene to form an alkyl substituted benzene wherein the alkyl substituent contains the same number of carbon atoms as said saturate, and separating said alkyl substituted benzene from the reaction mixture.

7. The process according to claim 6 wherein the mole ratio of hydrogen fluoride to benzene plus saturate hydrocarbon fraction is from 8:1 to 1:1.

8. An alkylation process which comprises bringing together, in the liquid phase at a temperature of from 50° C. to 200° C., hydrogen fluoride and a tertiary mono-olefin in the presence of toluene and an isoparaffin hydrocarbon having at least 1 tertiary hydrogen atom, wherein the mole ratio of said isoparaffin to said toluene is from 5:1 to 1:6 and the mole ratio of said mono-olefin to toluene plus said isoparaffin is from 1:10 to 1:1, whereby said isoparaffin alkylates said toluene to form an alkyl aromatic having an alkyl substituent containing the same number of carbon atoms as said isoparaffin hydrocarbon, and separating said alkyl substituted toluene from the reaction mixture.

9. The process according to claim 8 wherein the tertiary olefin is isobutylene and the isoparaffin is a saturate hydrocarbon fraction.

10. The process according to claim 9 wherein the mole ratio of hydrogen fluoride to toluene plus saturate is from 8:1 to 1:1.

11. An alkylation process which comprises bringing together, in the liquid phase at a temperature of from 50° C. to 200° C., hydrogen fluoride and a tertiary mono-olefin in the presence of a petroleum hydrocarbon fraction containing alkylatable aromatics and isoparaffins wherein said isoparaffins have more than 5 carbon atoms per molecule and at least 1 tertiary hydrogen atom per molecule, and wherein the mole ratio of said isoparaffins to said aromatics is from 5:1 to 1:6 and the mole ratio of said tertiary mono-olefin to said isoparaffins plus said aromatics is from 1:10 to 1:1, whereby said isoparaffins alkylate said alkylatable aromatics to form alkyl substituted aromatics wherein an alkyl substitutent thereof contains the same number of carbon atoms as said isoparaffin, and separating said alkyl substituted aromatics from the reaction mixture.

12. The process according to claim 11 wherein the tertiary olefin is isobutylene.

13. Process for the alkylation of aromatics with isoparaffins which comprises bringing together in the liquid phase at a temperature of from 50° C. to 200° C., hydrogen fluoride and a tertiary mono-olefin in the presence of an aromatic hydrocarbon and an isoparaffin hydrocarbon whereby a catalytic condition is established effective to cause said isoparaffin to alkylate said aromatic, said tertiary mono-olefin being converted to the corresponding paraffin, the mole ratio of isoparaffin to aromatic being from 1:5 to 6:1, the mole ratio of tertiary mono-olefin to aromatic plus isoparaffin being from 1:10 to 1:1, and the mole ratio of hydrogen fluoride to aromatic plus isoparaffin being from 1:1 to 8:1, mixing said reaction mixture for from ¼ to 2 hours, and recovering an alkylated aromatic product wherein an alkyl radical contains the same number of carbon atoms as said isoparaffin.

References Cited in the file of this patent

UNITED STATES PATENTS 2,626,966 Kennedy et al. _____ Jan. 27, 1953
2,653,980 Condon _____ Sept. 29, 1953

OTHER REFERENCES

Condon et al.,: Jour. Am. Chem. Soc., vol. 70, pages 2539–2542 (July 1948).